United States Patent [19]

Draa

[11] 3,999,459

[45] Dec. 28, 1976

[54] MINE ROOF BOLT ANCHOR CONSTRUCTION AND METHOD OF MAKING THE SAME

[75] Inventor: Wayne A. Draa, Alliance, Ohio

[73] Assignee: Gottschall Tool & Die Co., Salem, Ohio

[22] Filed: Mar. 14, 1975

[21] Appl. No.: 558,266

[52] U.S. Cl. .................................. 85/76; 85/85
[51] Int. Cl.² .................................. F16B 13/06
[58] Field of Search ............. 85/76, 87, 88, 85, 86, 85/75, 77, 79, 73, 74, 83, 67

[56] References Cited

UNITED STATES PATENTS

| 1,198,719 | 9/1916 | Gisser | 85/75 |
|---|---|---|---|
| 1,396,569 | 11/1921 | Girvan | 85/85 |
| 1,636,842 | 7/1927 | Tomkinson | 85/88 |
| 2,667,099 | 1/1954 | Lewis | 85/74 |
| 2,753,750 | 7/1956 | Dempsey | 85/87 |
| 2,878,709 | 3/1959 | Horvath | 85/87 |
| 3,221,590 | 12/1965 | Dickow | 85/76 |
| 3,248,998 | 5/1966 | Siegel | 85/87 |
| 3,315,557 | 4/1967 | Dickow | 85/75 |
| 3,577,825 | 5/1971 | Reusser | 85/76 |
| 3,620,120 | 11/1971 | Warner | 85/76 |
| 3,683,741 | 8/1972 | Pete | 85/88 |
| 3,726,181 | 4/1973 | Dickow et al. | 85/75 |

Primary Examiner—Roy D. Frazier
Assistant Examiner—Rodney H. Bonck
Attorney, Agent, or Firm—Frease & Bishop

[57] ABSTRACT

A bolt anchor construction for attaching metal plates to the roof of a mine tunnel. An expansion shell having a plurality of spaced metal fingers extending from a collar is telescopically mounted on a bolt. A camming plug is threadably mounted on one end of the bolt and is located within and engageable with the spaced fingers. A series of coined teeth is formed in the outer surface of each finger. The camming plug is mounted within the spaced finger ends by a generally U-shaped bail and is movably retained therein to compensate for various size holes. The ends of the bail are secured to the collar. The camming plug forces the fingers outwardly upon rotation of the bolt whereupon the teeth bite into the rock surrounding the drilled hole to attach the plates to the mine roof. Vertical movement of the fingers with respect to each other is prevented by closing the shell collar by the overlapping of tabs formed on the collar ends.

The fingers and collar are stamped from flat sheet metal in a progressive die. A pair of tabs is stamped in one collar end forming a notch therebetween, and a single tab is stamped in the opposite collar end during the stamping procedure. The fingers and collar are folded in the final steps of the progressive die to form a rectangular configuration with the single tab being inserted in the notch formed on the opposite collar end. The pair of tabs then is staked into overlapping relationship with the single tab to close the shell collar.

7 Claims, 15 Drawing Figures

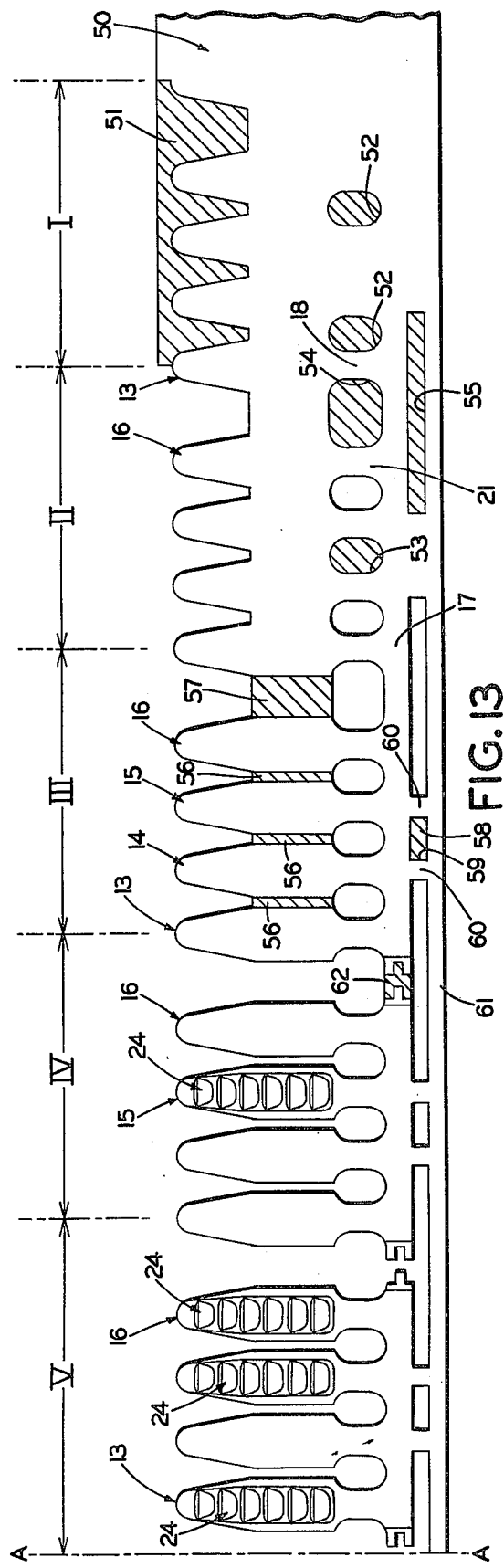
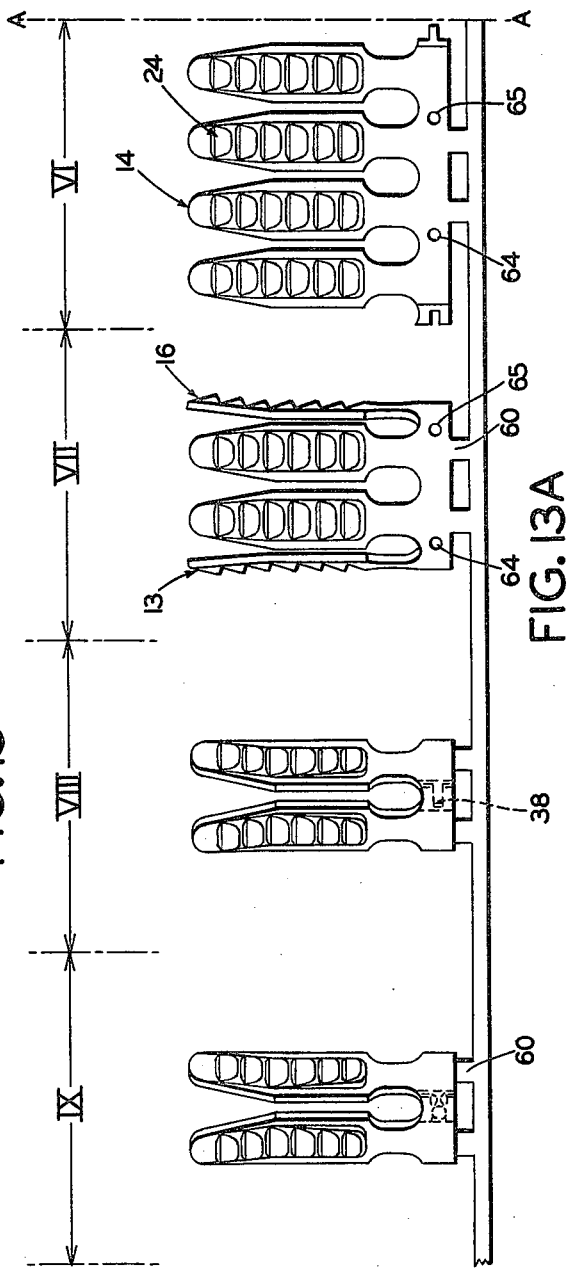
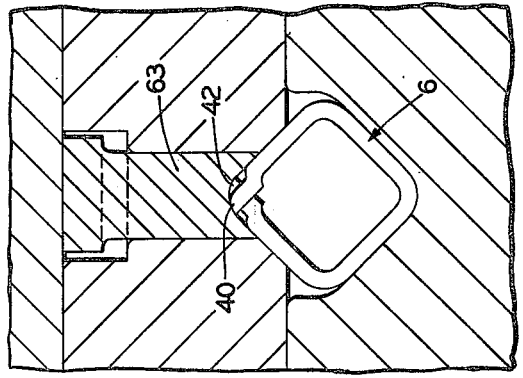
FIG. 13
FIG. 13A
FIG. 14

MINE ROOF BOLT ANCHOR CONSTRUCTION AND METHOD OF MAKING THE SAME

CROSS REFERENCE TO RELATED APPLICATION

The invention is an improvement on the mine roof bolt anchor construction of my copending application, Ser. No. 483,790, filed June 27, 1974 now U.S. Pat. No. 393,840.

BACKGROUND OF THE INVENTION

1. Field of the Invention

The invention relates to fastening devices and in particular to fastening devices having an expansion shell for gripping surrounding material to which an item is to be attached. More particularly, the invention relates to a bolt anchor construction for attaching metal plates to the roof of a mine tunnel and to a method of making the same from sheet metal, in which the expansion shell has a closed collar, and in which rock gripping fingers are expanded outwardly by a camming plug which is adjustably retained within the fingers by a securely connected bail.

2. Description of the Prior Art

Numerous anchor bolt constructions, fastening devices and methods of making the same have been devised for attaching articles together and in particular for attaching plates or other supports to surrounding rock, soil or strata. Examples of such anchor constructions and methods of producing them are illustrated and described in U.S. Pat. Nos. 1,139,712, 1,513,301, 1,772,064, 1,802,270, 2,667,099, 2,762,119, 2,799,201, 3,250,170, 3,315,557, 3,381,567, and 3,577,825. Most of these fasteners include a bolt having an expansion-type shell mounted thereon which is expanded outwardly into gripping contact with the walls of a drilled hole by a camming-type plug.

Expansion shells for such anchors are formed of malleable iron, stamped from metal sheets or hot formed in hot rolled steel sheets. The malleable iron shells present problems of breakage upon the fingers moving outwardly to grasp the surrounding walls of a drilled hole especially where voids or noncylindrically shaped drill holes are encountered. The malleable iron shells also are expensive to produce in large quantities which are required for most mine installations. The hot rolled steel expansion shells eliminate much of the breakage problem, but also are expensive and difficult to produce in vast quantities.

Recently, expansion shells have been developed for such mine anchors which are stamped and coined from metal sheets such as shown in U.S. Pat. Nos. 3,577,825 and 3,938,420. Such stamping and coining procedures result in a strong, durable and inexpensive expansion shell which can be mass produced more conveniently and economically than prior known shells. Problems, however, have been encountered with such sheet metal expansion shells during their installation, due to the shell collars being open along one end after being folded into final shape.

The finger teeth bite into the surrounding rock of the mine roof as the plug is advanced downwardly during installation. The fingers will expand outwardly with respect to each other with only a very small amount of vertical movement. However, various degrees of rock hardness, voids, etc. adjacent the drilled hole will result in one finger of the expansion shell moving vertically and/or radially with respect to one or more of the other fingers. Thus, one finger will move downwardly and/or outwardly more than another finger of the shell causing the shell to twist and to open because of the unconnected collar ends, rather than expand uniformly outwardly. This results in anchorage failure because of uneven teeth engagement with the surrounding rocks and improper camming action between the plug and shell fingers.

Known solutions to these problems have been the welding together of the open collar ends or the welding of a washer to the bottom of the collar. Either of these solutions requires a completely separate manufacturing step apart from the stamping procedure which increases the cost per shell produced. Likewise, either solution requires a welding operation which requires some degree of skill to accomplish a satisfactory weld. Also, excess welding heat will weaken the surrounding metal of the collar adjacent the welded collar edges, and not enough welding heat will result in an unsatisfactory weld.

Thus, the need has existed for a bolt anchor construction and for a method of producing the same in which the expansion shell is stamped, coined, and formed from metal strips, and in which the open collar ends of the shell can be joined during the shell stamping operation without heating, welding, or additional components being required.

Problems also have been encountered with known anchor bolt constructions which use a metal bail to retain the camming plug and bolt within the shell prior to installation, since such constructions do not permit compensation for various sizes of drilled holes. Examples of mine roof bolt anchors having a retaining bail are shown in U.S. Pat. Nos. 927,064, 2,667,099, 2,753,750, 2,787,931, 2,878,709 and 3,022,700.

A hole drilled in the roof of a mine for insertion of an expansion bolt assembly therein may vary several sixteenths of an inch in diameter depending upon the age and condition of the drill bit, and the type of rock encountered during drilling. Most known anchor bolt constructions using a retaining bail do not permit the open finger ends of the shell to be adjusted for the varying hole sizes, in that the bail retains the camming plug in fixed rigid position against the open finger ends. Likewise, in those anchor bolt constructions having a retaining bail which do permit some adjustment of the retaining plug, the lower ends of the bail are not secured rigidly to the shell which results in additional problems during assembly, shipment, stamping and use.

Thus, the need also has existed for an anchor bolt construction having a camming plug retaining bail which is firmly attached to the shell, yet in which the bail enables limited movement of the camming plug when the anchor bolt is installed to compensate for minor variations in the hole size.

SUMMARY OF THE INVENTION

Objectives of the invention include providing a mine roof bolt anchor construction which is stamped and coined from a continuous metal strip rapidly, economically and in large quantities; providing an anchor bolt construction in which the expansion shell has a plurality of spaced fingers each having a series of teeth coined in the outer surface thereof, with the teeth extending from an integral collar; providing an anchor bolt construction in which the shell collar is formed with a pair of spaced tabs at one collar end which provides a notch therebetween, in which a single tab is formed on the opposite collar end which is complementary in size and configuration to the notch formed on the other collar end, and in which the single tab is located within the notch upon closing of the shell fingers, with the spaced tabs being staked into overlapping relationship with the single tab to close the shell collar; providing a bolt anchor construction in which the camming plug is retained within the open finger ends of the shell by a generally U-shaped metal bail with the open ends of the bail being secured in holes formed in the shell collar; providing such a bolt anchor construction in which the web portion of the bail is spaced sufficiently above the open shell finger ends to permit movement of the camming plug into and out of the open shell finger ends to compensate for minor variations in the diameter of the drilled hole; and providing an improved method of forming the expansion shell with a closed collar during the stamping of the shell without requiring welding or other fastening procedures to connect the collar ends.

These objectives and advantages are obtained by the improved mine roof bolt anchor construction the general nature of which may be stated as including, a bolt having a threaded shank portion and a camming plug threadably engaged with the bolt for advancement along the threaded shank portion; an expansion shell having a generally tubular rectangular shape telescopically mounted on the bolt and engageable with the camming plug for expansion of the shell outwardly upon advancement of the plug along the threaded shank portion; the expansion shell including a collar having first and second ends, a bottom edge and top edge portions; a plurality of metal fingers having teeth formed therein extending outwardly from the collar between adjacent top edge portions; tab means having an end formed on the first collar end and extending outwardly therefrom toward the second collar end; U-shaped notch means having U-ends formed in the second collar end; the tab means extending into and through and being engaged within the notch means; the tab means and notch means and their ends being mutually staked to each other securely joining the first and second collar ends to form a completely closed expansion shell collar; the first collar end tab means being a single tab and the notch means being formed by a pair of spaced tabs; the U-shaped notch means being complementary in size and configuration to the single tab; generally U-shaped bail means having a web and a pair of legs extending from the web; the bail legs extending between pairs of adjacent fingers and attached securely to the collar; the shell fingers having free ends forming a camming plug receiving opening with the camming plug extending axially through the opening into the expansion shell and being supported by the free finger ends; the web of the bail means being spaced above the camming plug, with the camming plug being slidably mounted between the free finger end receiving opening and the bail web whereby the plug may be moved outwardly with respect to the receiving opening to permit the size of the receiving opening to be reduced by inward movement of the finger free ends; the collar end tab means being stamped in the collar ends while the expansion shell is in unfolded condition, with the tab means being interposed with each other upon folding of the shell to its rectangular shape; and the tab means being mutually staked to each other after folding of the expansion shell to form a completely closed expansion shell collar.

BRIEF DESCRIPTION OF THE DRAWINGS

A preferred embodiment of the invention — illustrative of the best mode in which applicant has contemplated applying the principles — is set forth in the following description and shown in the drawings and is particularly and distinctly pointed out and set forth in the appended claims.

FIGS. 13 and 13A are general diagrammatic views showing one manner of producing the improved expansion shell in a progressive die; and FIG. 14 is an enlarged end view of the expansion shell collar end closing dies in section.

Similar numerals refer to similar parts throughout the drawings.

DESCRIPTION OF THE PREFERRED EMBODIMENT

Figures 1, 2, 10, 11, 12:
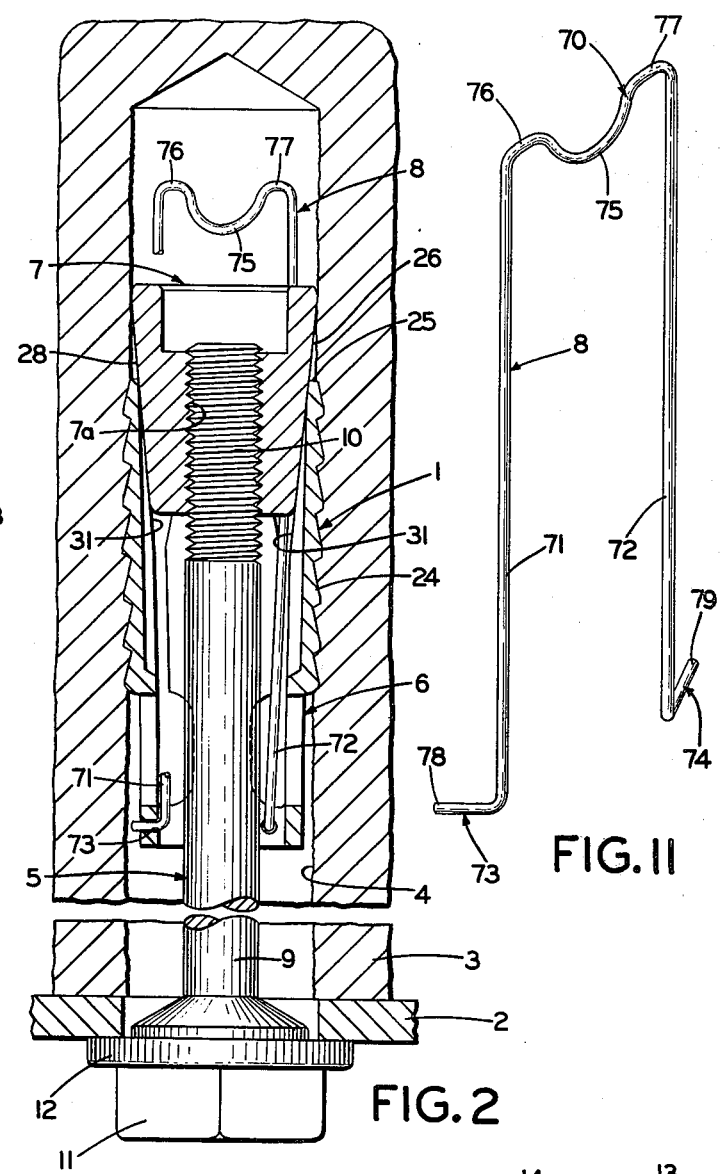
FIG. 1 is an elevational view showing the improved mine roof bolt anchor assembly inserted within a drilled hole in a mine roof prior to expansion.
FIG. 2 is a view similar to FIG. 1, portions of which are in section and broken away, showing the anchor bolt assembly in expanded operating position.
FIG. 10 is a sectional view taken on line 10—10, FIG. 3.
FIG. 11 is a perspective view of the camming plug retaining bail of FIGS. 3 and 4.
FIG. 12 is a rear elevational view of the fingers and collar of the improved anchor bolt expansion shell, after stamping of a metal strip, and before final shaping and closure.

The improved bolt anchor construction is indicated generally at 1 and is shown in FIGS. 1 and 2 attaching a metal reinforcing plate 2 to a roof 3 of a mine tunnel. FIG. 1 shows bolt anchor assembly 1 located within a hole 4 drilled in mine roof 3 prior to being expanded to its holding position of FIG. 2. Bolt anchor assembly 1 includes as major components a bolt 5, an expansion shell 6, a camming plug 7, and a camming plug retaining bail 8. Bolt 5 has a shank 9 with an upper threaded portion 10 and a head 11. A washer 12 preferably is located between head 11 and mine roof plate 2 when installing the roof plate.

Figure 5:
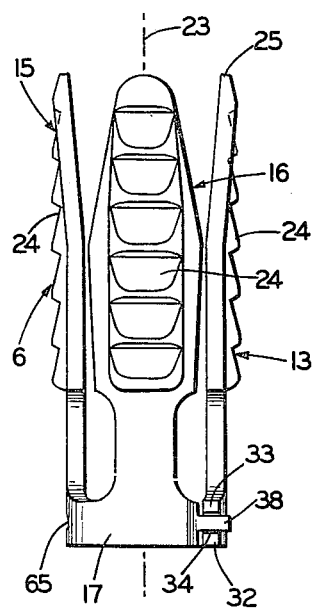
FIG. 5 is a reduced elevational view of the improved expansion shell in folded position prior to closing of the shell collar ends.
Figure 6:
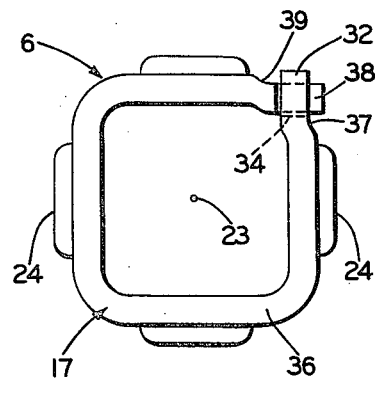
FIG. 6 is an enlarged bottom plan view of the expansion shell shown in FIG. 5.

Improved shell 6 is shown in FIG. 12 in a flat unfolded condition after being stamped and coined in an improved metal working procedure described more fully below, and prior to being folded into its final shape. Shell 6 has four fingers 13, 14, 15 and 16 integrally joined at their lower ends to a collar 17 by stem portions 18, 19, 20 and 21, respectively. Collar 17 is folded along three imaginary lines 22 during the improved metal working procedure so that fingers 13–16 provide shell 6 with a rectangular, tubular configuration as shown in FIGS. 5 and 6. Each finger 13–16 is located generally perpendicular with respect to the two adjacent fingers and diametrically opposite the third finger.

Fingers 13–16 extend generally longitudinally along and parallel with the longitudinal axis of shell 6 indicated at 23 in FIGS. 5 and 6. The top portions of fingers 13–16 may be bent outwardly at a slight angle (FIG. 5) to provide a flared end to shell 6 for facilitating the seating of camming plug 7 therein when bolt anchor 1 is installed in mine roof hole 4.

Fingers 13–16 preferably are identical in size, shape, and configuration, and have a series of teeth or toothed portion 24 coined or cold metal formed in the fingers extending longitudinally from the outer or free finger ends 25 to adjacent stems 18–21. Teeth 24 may have various configurations such as shown in U.S. Pat. No. 3,577,825 or 3,938,420, which teeth form no part of this invention.

Camming plug 7 is similar to camming plugs used for several known anchor bolt constructions, such as shown in U.S. Pat. No. 3,577,825. Plug 7 has a threaded bore 7a for engagement with threaded portion 10 of shank 9 and is formed with a plurality of tapered, flat sides 26, 27, 28 and 29 (FIG. 10) which are adapted to engage and slide along longitudinal bearing strips 30 and 31 formed on the inner surfaces of fingers 13–16 (FIG. 12).

In accordance with the invention, collar 17 is formed with a pair of spaced tabs 32 and 33 at one end (FIG. 12) which project longitudinally outwardly with respect to and from collar 17. Tabs 32 and 33 preferably have a generally rectangular configuration and form a U-shaped somewhat rectangular notch 34 therebetween. The lower edge or side 35 of bottom tab 32 preferably is longitudinally aligned and continuous with lower edge or side 36 of collar 17. Tabs 32 and 33 may join collar 17 with a slight offset shoulder 37 being formed therebetween.

A single tab 38 is formed integrally with and projects longitudinally outwardly from the midpoint or center portions of the other end of collar 17 for engagement in notch 34 to securely join the open collar ends when the shell is in folded position. Tab 38 preferably is rectangular being complementary in shape and size to notch 34. Tab 38 is spaced from bottom edge 36 of collar 17 a distance approximately equal to the width of bottom tab 32, and preferably is joined integrally with collar 17 by an offset shoulder 39.

Figure 3:
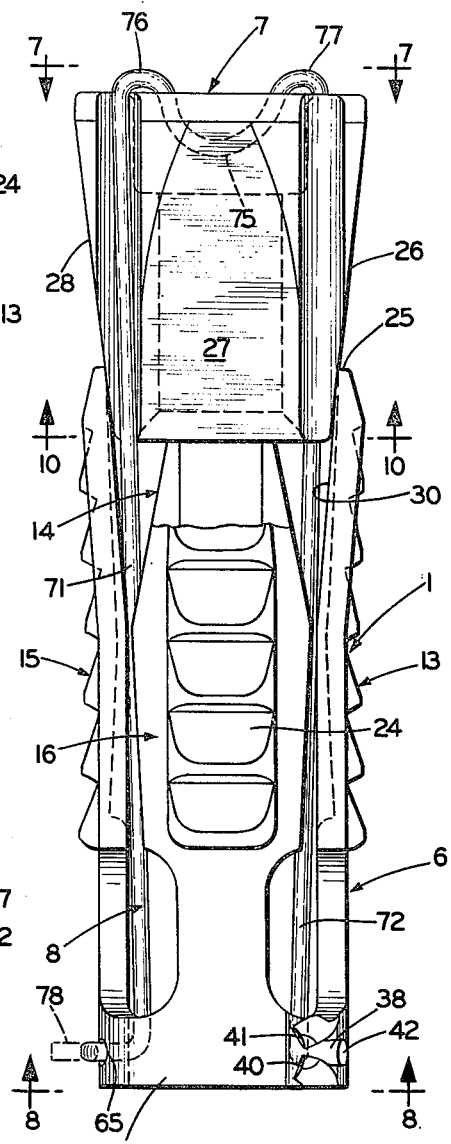
FIG. 3 is an enlarged elevational view, with portions broken away, of the improved anchor shell together with a retaining bail and camming plug, with the camming plug shown in raised position.
Figure 9:
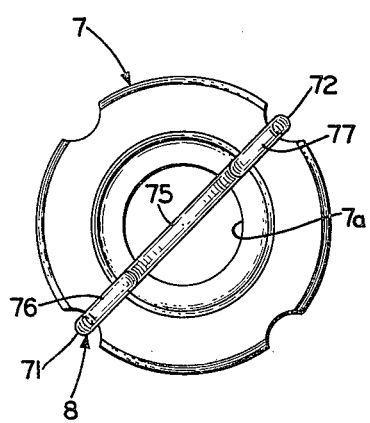
FIG. 9 is an enlarged fragmentary view of the closed collar ends looking in the direction of arrows 9—9, FIG. 8.

FIGS. 5 and 6 show tab 38 being inserted within notch 34 and extending between and interposed with spaced tabs 32 and 33 prior to final staking or closing of tabs 32 and 33 with respect to tab 38. Tabs 32 and 33 upon mutual staking with tab 38 are bent generally inwardly towards each other so as to partially overlap single tab 38 (FIGS. 3 and 9). Ends 40, 41 and 42 of tabs 32, 33 and 38, respectively, are curved or rounded during this final staking operation. Cuved ends 40–42 eliminate sharp projections extending from the collar which could bind in a drilled hole 4 during installation of bolt anchor 1. Also offset shoulders 37 and 39 together with rounded tab ends 40–42 enable the joined collar ends, which form collar corner 43, to conform with the curved corners 44, 45 and 46 (FIG. 8) of expansion shell 6 when in final folded assembled condition.

Figures 7, 8:
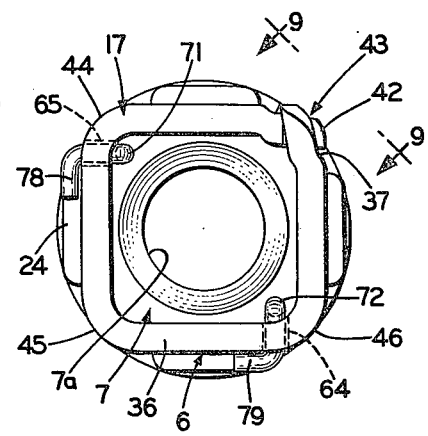
FIG. 7 is a top plan view of the expansion shell, camming plug and retaining bail, looking in the direction of arrows 7—7, FIG. 3.
FIG. 8 is a bottom plan view looking in the direction of arrows 8—8, FIG. 3.

The extended end 42 of tab 38 also is folded inwardly and somewhat circumferentially from the position of FIG. 6 toward collar offset shoulder 37 to the position of FIG. 8 to assist in rigidly joining the heretofore spaced, unjoined collar ends.

Tabs 32, 33 and 38, thus, enable the unjoined collar ends to be connected firmly and securely without welding or heating, and without requiring additional parts or elements, heretofore required with known cold stamped metal anchor expansion shell constructions.

An improved method of making expansion shell 6 with a completely closed and securely joined collar 17 is shown diagrammatically in FIGS. 13 and 14. Shell 6 preferably is formed by cold metal working, stamping and coining procedures on a continuous sheet metal trip in a high tonage press by a progressive die, although a series of individual die stamping procedures can be used.

A continuous metal strip 50 is fed from a coil of sheet metal through a pair of straightening rolls (not shown) to a press containing the progressive die. The general finger outlines preferably are formed initially by slotting and removing of material from areas 51 between the upper portions of the fingers (indicated by the shaded areas) and by piercing two oval-shaped openings 52 between the lower portions of the eventual fingers and collar, as indicated by progressive die step I. Openings 52 function as indexing holes for movement of strip 50 during the remaining stamping steps, as well as initially forming some of collar stem portions.

Progressive die step II then forms a third oval-shaped opening 53, and forms a generally rectangular opening 54 adjacent stem portions 21 and 18 of teeth 16 and 13 between the individual shell blanks by removal of additional sheet metal material. An elongated rectangular opening 55 also may be removed from strip 50 during die step II which continues the formation of collar 17 and stem portions 18–21.

Step III removes longitudinal areas 56 of sheet metal from between fingers 14–16 by a slotting procedure, and an enlarged area 57 between adjacent shell blank fingers 16 and 13 to complete the formation of the finger outlines. Likewise, an additional smaller rectangular-shaped portion of material 58 also may be removed from strip 50 providing an opening 59 for forming collar 17. A pair of strips 60 are formed during step III for retaining the shell blank connected to the remaining portion 61 of strip 50.

In accordance with the invention, step IV forms tabs 32, 33 and 38 by removal of material 62 between fingers 16 and 13 of adjacent shell blanks. Teeth 24 may be coined on finger 15 simultaneously with the removal of material 62. Teeth 24 of fingers 13 and 16 are coined therein during step V, with the remaining teeth 24 of finger 14 being formed in step VI.

Outer fingers 13 and 16 are bent inwardly toward closed position in step VII with the final closure of expansion shell 6 being accomplished in step VIII. Upon completion of step VIII, tab 38 is located within notch 34 interposed, between uncrimped and unworked tabs 32 and 33, as shown in FIGS. 5 and 6. In step IX (FIG. 14) tabs 32 and 33 are crimped or staked into overlapping relationship with respect to tab 38 by an upper ram die 63. The extended ends 40–42 of the tabs have their rounded or curved shapes imparted thereto by die 63 simultaneously with the overlapping and crimping of tabs 32 and 33 with respect to single tab 38.

The particular order in which the various notched, slotted, pierced and cut-out areas are removed together with the formation of the finger teeth can be varied somewhat, as well as the particular cold metal working done during each step of the progressive die without effecting the concept of the invention. The amount of work performed on the shell blank during each step is dependent upon the stamping pressure required of the press during that step and the size of the press performing the procedure. The securing of the tabs of closed collar 17 in step IX (FIG. 14) also could be accomplished as a separate step after shearing shell 6 from the retaining strips 60 if so desired.

Preferably the complete closing and interlocking of the collar tabs is performed while shell 6 is attached to strip portion 61 thereby eliminating a separate operation on the shell after it is severed from retaining strips 60.

The improved method, thus provides a means for progressively slotting, coining, notching, closing and joining the shell from a flat metal strip to a completed expansion shell 6 for assembly with a camming plug and bolt, without any handling or separate manipulations or operations required to be performed on the moving strip. Holes 64 and 65 for attachment of bail 8, as described below, also may be formed in shell 6, as shown in step VI, or in either of steps I–V where the working tonage permits.

Figure 4:
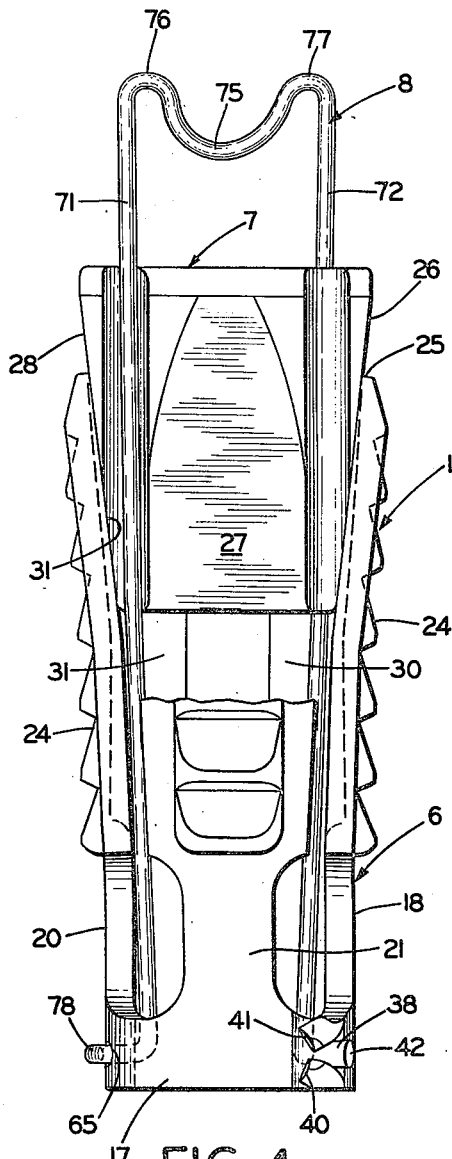
FIG. 4 is a view similar to FIG. 3, with the camming plug shown in lowered adjusted postion.

Also in accordance with the invention, improved mine roof bolt anchor construction 1 has an improved camming plug retaining bail arrangement shown particularly in FIGS. 3 and 4. Bail 8 has a generally U-shaped configuration (FIG. 11) with a web 70 and a pair of legs 71 and 72, with legs 71 and 72 terminating in outward feet 73 and 74, respectively. Web 70 is formed with a central inwardly curved portion 75 which is connected to legs 71 and 72 by generally horizontal sections 76 and 77.

Bail feet 73 and 74 extend through holes 64 and 65 formed in collar 17 with the extended end portions 78 and 79 being bent transversely with respect to the legs 71 and 72 (FIG. 8) along collar 17. Bail 8 is of sufficient length with respect to expansion shell 6 to permit limited movement of camming plug 7 within the open shell end from a raised position of FIG. 3 to a lowered position of FIG. 4 to compensate for minor variations in the size of the drilled hole.

Depending upon the condition of the drill bit and rock encountered, the drilled hole may vary several sixteenths of an inch, for example, between 1-5/16 inch to 1-7/16 inch. The loose or movable camming plug-bail arrangement of anchor bolt construction 1 enables the finger ends of the expansion shell and camming plug to be adjusted to compensate for such minor variations in the hole size.

For the smaller hole size (1-5/16 inch) camming plug 7 is moved upwardly to the position of FIG. 3 whereby the outer finger ends 25 which form a generally rectangular end opening can be moved inwardly before contacting the sides of the camming plug. The anchor shell and camming plug assembly, thus, can be inserted easily into the smaller drilled hole with the finger teeth sufficiently engaging the walls of the drilled hole to prevent rotation and movement of shell 6 upon rotation of bolt 5 and the subsequent advancement of plug 7.

When encountering a slightly larger hole 4 (1-7/16 inch) finger ends 25 can be moved outwardly approximately one-sixteenth of an inch each to compensate for the increased hole size with plug 7 moving downwardly within bail 8 to the position of FIG. 4. This downward movement of plug 7 insures that the plug maintains contact with the inner camming surfaces 30 and 31 of the fingers, and that the finger teeth of the bolt assembly when inserted into the slightly enlarged drilled hole will grip the hole walls sufficiently to prevent rotation of the shell during installation.

Such adjustment of the finger ends 25 to adjust the shell end opening and axial movement of camming plug 7 is not possible with most known bolt anchor constructions due to the immovable relationship of the plug with respect to the finger ends and bail. Likewise, the rigid connection of the bail ends 73 and 74 with the collar 17 prevents the bail from prematurely becoming disengaged from the expansion shell prior to installation. Another important advantage of the bail arrangement is the rigid attachment of the bail feet to the collar which is accomplished easily without welding, machining or other expensive operations being required. The attachment of the bail feet to the collar eliminates the heretofore undesirable attachment of the bail to the expansion shell fingers used in many bolt anchor constructions.

The improved mine roof bolt anchor construction provides an assembly in which the expansion shell has a completely and securely closed collar eliminating vertical separation of the collar ends, heretofore encountered in known anchor shell constructions; provides such a closed collar shell which can be produced economically and in vast quantities in an improved metal working procedure in a progressive die whereby the expansion shells are formed complete and in closed secured position from an inserted strip of sheet metal; provides an anchor bolt construction having a camming plug retaining bail, the extended ends of which are securely attached to the collar by extending through holes formed therein preventing premature disassembly of the assembled bolt anchor construction; provides such a construction in which the bail arrangement enables the camming plug to be movably retained within the open shell to permit minor adjustment of the shell finger ends to compensate for variations in the drilled hole by locating the bail web a predetermined distance above the shell finger ends; and providing such a construction which is effective, safe, inexpensive and efficient in assembly, operation and use, and which achieves all the enumerated objectives, provides for eliminating difficulties encountered with prior bolt anchor constructions and solves problems and obtains new results in the art.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction and method illustrated and described herein is by way of example, and the scope of the present invention is not limited to the exact details of construction and method shown or described.

Having now described the features, discoveries and principles of the invention, the manner in which the improved expansion shell is made and assembled in secured, closed position, and the manner in which the improved mine roof bolt anchor construction is constructed, assembled and operated, the characteristics of the new construction, and the advantageous, new and useful results obtained; the new and useful structures, devices, elements, arrangements, parts, and combinations are set forth in the appended claims.

I claim:

1. An improved stamped metal expansion shell for a mine roof bolt anchor construction of the type having a bolt with a threaded shank portion and a camming plug threadably engaged with the bolt, and in which the expansion shell has a generally tubular rectangular shape and is telescopically mounted on the bolt and engageable with the camming plug for expansion of the shell outwardly upon advancement of the plug along the threaded shank portion; in which the expansion shell includes a collar having first and second ends, a bottom edge and top edge portions; and in which a plurality of metal fingers having teeth formed therein extend outwardly from the collar between adjacent top edge portions; the improvement including:
   a. tab means having an end formed on the first collar end and extending outwardly therefrom toward the second collar end;
   b. U-shaped notch means having U-ends formed in the second collar end;
   c. the tab means extending into and through and being engaged within said notch means; and
   d. the tab and notch means and their ends being mutually staked to each other with said U-ends being in overlapping relationship with respect to the tab means securely joining the first and second collar ends to form a completely closed expansion shell collar preventing any movement of the collar ends with respect to each other.

2. The expansion shell construction defined in claim 1 in which the first collar end tab means is a single tab; in which the notch means is formed by a pair of spaced tabs each having an end; in which said single tab is located between said pair of tabs; and in which the ends of said pair of tabs lie in overlapping relationship with respect to the single tab when the tabs are staked to each other.

3. The expansion shell construction defined in claim 2 in which the single tab has a generally rectangular shape and is spaced generally midway with respect to the top edge portions and bottom edge of the collar; and in which the U-shaped notch means is complementary in size and configuration to said single tab.

4. The expansion shell construction defined in claim 2 in which the ends of the single and pair of tabs are generally rounded when staked to each other.

5. The expansion shell construction defined in claim 1 in which the collar has a generally rectangular configuration with four corners; and in which the staked tab means and notch means form one of said corners.

6. An improved stamped metal expansion shell of the type having a generally rectangular shape with a collar having first and second ends in close juxtaposition, and a plurality of fingers having teeth formed therein extending upwardly outwardly from a top edge of the collar; the improvement including:
   a. a single tab formed on the collar first end and extending outwardly therefrom toward the collar second end;
   b. a pair of spaced tabs formed on the collar second end and extending outwardly therefrom toward the collar first end, said spaced tabs forming a notch therebetween;
   c. the single tab extending into and through the notch formed by the pair of tabs; and
   d. the single and pair of tabs being mutually staked to each other with the pair of tabs being in overlapping relationship with respect to the single tab securely joining the first and second ends of the collar to form a completely closed expansion shell collar, with said collar ends being firmly fixed with respect to each other preventing separation of the joined collar ends.

7. The expansion shell defined in claim 6 in which the collar has a rectangular configuration with four corners; in which the staked tabs form one of the corners; and in which the ends of the staked tabs are generally rounded.

* * * * *

UNITED STATES PATENT AND TRADEMARK OFFICE
CERTIFICATE OF CORRECTION

PATENT NO. : 3,999,459
DATED : December 28, 1976
INVENTOR(S) : Wayne A. Draa

It is certified that error appears in the above-identified patent and that said Letters Patent are hereby corrected as shown below:

Column 1, line 10, change "393,840" to -3,938,420-;

Column 5, line 65, change "Cuved" to -Curved-;

Column 6, line 21, change "trip" to -strip-; and

Column 6, line 65, change "uncrimpled" to -uncrimped-.

Signed and Sealed this

Eighth Day of March 1977

[SEAL]

Attest:

RUTH C. MASON
Attesting Officer

C. MARSHALL DANN
Commissioner of Patents and Trademarks